United States Patent
Ramesh et al.

(10) Patent No.: US 7,283,999 B1
(45) Date of Patent: Oct. 16, 2007

(54) SIMILARITY STRING FILTERING

(75) Inventors: Bhashyam Ramesh, San Diego, CA (US); Michael W. Watzke, Madison, WI (US)

(73) Assignee: NCR Corp., Dayton, OH (US)

( * ) Notice: Subject to any disclaimer, the term of this patent is extended or adjusted under 35 U.S.C. 154(b) by 476 days.

(21) Appl. No.: 10/740,780

(22) Filed: Dec. 19, 2003

(51) Int. Cl.
*G06F 17/30* (2006.01)
(52) U.S. Cl. ............................................. 707/6; 707/3
(58) Field of Classification Search ................ 707/1–6, 707/100–102; 370/401; 382/310
See application file for complete search history.

(56) References Cited

U.S. PATENT DOCUMENTS

| | | | | |
|---|---|---|---|---|
| 6,023,536 | A * | 2/2000 | Visser | 382/310 |
| 7,010,522 | B1 * | 3/2006 | Jagadish et al. | 707/3 |
| 7,133,409 | B1 * | 11/2006 | Willardson | 370/401 |
| 2006/0179052 | A1 * | 8/2006 | Pauws et al. | 707/6 |

OTHER PUBLICATIONS

Stefan Burkhardt, Juha Kärkkäinen, One-Gapped Q-Filters for Levenshtein Distance, 2002, (no month).
Gonzalo Navarro, A Guided Tour to Approximate String Matching, ACM Computing Surveys, vol. 33, Issue I, pp. 31-88, Mar. 2001.

* cited by examiner

*Primary Examiner*—Don Wong
*Assistant Examiner*—Hung Tran Vy
(74) *Attorney, Agent, or Firm*—Howard Speight

(57) ABSTRACT

A method, computer program and system for optimizing similarity string filtering are disclosed. A first data string comprising one or more data characters and selecting a second data string comprising one or more data characters are selected. At least one of a defined set of shapes is applied to the first data string to generate one or more patterns associated with the first data string. At least one of the defined set of shapes is applied to the second data string to generate one or more patterns associated with the second data string. The one or more patterns associated with the first data string are compared with the one or more patterns associated with the second data string to determine if one or more matching patterns exist. The first data string and the second data string are linked if one or more matching patterns exist.

52 Claims, 8 Drawing Sheets

FIG. 5A

| | START LENGTH | STOP LENGTH | S1 | L1 | S2 | L2 | STOP | SHAPES | | GENERATED N-GRAM PATTERNS |
|---|---|---|---|---|---|---|---|---|---|---|
| 513a | 1 | 3 | 0 | 1 | 0 | 0 | -1 | # | ~502a | 1 |
| 513b | 1 | 3 | 1 | 1 | 0 | 0 | -1 | _# | ~502b | 1 |
| 513c | 3 | 5 | 0 | 3 | 0 | 0 | 0 | ### | ~502c | 3-5 |
| 513d | 3 | 5 | 0 | 2 | 3 | 1 | 0 | ##_# | ~502d | 3-5 |
| 513e | 5 | 7 | 0 | 4 | 0 | 0 | -5 | #### | ~502e | 5 |
| 513f | 5 | 7 | 0 | 3 | 4 | 1 | -1 | ###_# | ~502f | 1 |
| 513g | 7 | LIMIT | 0 | 6 | 0 | 0 | -7 | ###### | ~502g | 7 |
| 513h | 7 | LIMIT | 0 | 5 | 6 | 1 | -1 | #####_# | ~502h | 1 |

FIG. 5B

| | START LENGTH | STOP LENGTH | S1 | L1 | S2 | L2 | S3 | L3 | S4 | L4 | STOP | SHAPES | GENERATED N-GRAM PATTERNS |
|---|---|---|---|---|---|---|---|---|---|---|---|---|---|
| 515a | 1 | 3 | 0 | 1 | 0 | 0 | 0 | 0 | 0 | 0 | -1 | # | 1 |
| 515b | 2 | 3 | 1 | 1 | 0 | 0 | 0 | 0 | 0 | 0 | -1 | _# | 1 |
| 515c | 3 | 3 | 2 | 1 | 0 | 0 | 0 | 0 | 0 | 0 | -1 | _# | 1 |
| 515d | 2 | 4 | 0 | 2 | 0 | 0 | 0 | 0 | 0 | 0 | 0 | ## | 2-4 |
| 515e | 2 | 4 | 0 | 1 | 2 | 0 | 0 | 0 | 0 | 0 | 0 | #_# | 2-4 |
| 515f | 3 | 5 | 0 | 3 | 0 | 0 | 0 | 0 | 0 | 0 | 0 | ### | 3-5 |
| 515g | 4 | 5 | 0 | 2 | 3 | 0 | 0 | 0 | 0 | 0 | 0 | ##_# | 4-5 |
| 515h | 4 | 5 | 0 | 2 | 4 | 0 | 0 | 0 | 0 | 0 | 0 | #_## | 4-5 |
| 515i | 4 | 5 | 1 | 1 | 2 | 1 | 1 | 0 | 0 | 0 | 0 | (#,#)# | 4-5 |
| 515j | 4 | 5 | 0 | 1 | 0 | 0 | 2 | 0 | 0 | 0 | 0 | (#,#)# | 4-5 |
| 515k | 4 | 5 | 0 | 4 | 0 | 1 | 0 | 0 | 0 | 0 | 0 | ### _# | 4-5 |
| 515l | 4 | 5 | 0 | 3 | 4 | 2 | 0 | 0 | 0 | 0 | 0 | ##_## | 4-5 |
| 515m | 4 | 6 | 0 | 2 | 3 | 0 | 0 | 0 | 0 | 0 | 0 | #### | 4-5 |
| 515n | 6 | 7 | 0 | 4 | 0 | 1 | 0 | 0 | 0 | 0 | 0 | ### _# | 6-7 |
| 515o | 6 | 7 | 0 | 3 | 4 | 1 | 0 | 0 | 0 | 0 | 0 | ###_## | 6-7 |
| 515p | 6 | 7 | 0 | 3 | 5 | 1 | 0 | 0 | 0 | 0 | 0 | ##_### | 6-7 |
| 515q | 6 | 7 | 0 | 2 | 3 | 1 | 2 | 1 | 0 | 0 | -6 | ##(#,#) | 6 |
| 515r | 6 | 7 | 0 | 1 | 2 | 1 | 1 | 1 | 3 | 1 | -6 | ##(#,#)# | 6 |
| 515s | 8 | LIMIT | 0 | 4 | 0 | 0 | 0 | 0 | 0 | 0 | -8 | ### _# | 8 |
| 515t | 8 | LIMIT | 0 | 3 | 4 | 1 | 0 | 0 | 0 | 0 | -8 | ###_## | 8 |
| 515u | 8 | LIMIT | 0 | 2 | 3 | 1 | 2 | 1 | 0 | 0 | -3 | ##(#,#) | 3 |
| 515v | 8 | LIMIT | 0 | 1 | 2 | 1 | 1 | 1 | 3 | 1 | -3 | ##(#,#)# | 3 |

MICHEAL — 602

| SHAPE APPLIED | ROTATION | |
|---|---|---|
| #### (513e) | 1 | Mich ~ 602a |
| | 2 | iche ~ 602b |
| | 3 | chea ~ 602c |
| | 4 | heal ~ 602d |
| | 5 | ealM ~ 602e |
| ###_# (513f) | 1 | Mice ~ 602f |
| ###### (513g) | 1 | Michea ~ 602g |
| | 2 | icheal ~ 602h |
| | 3 | chealM ~ 602i |
| | 4 | healMi ~ 602j |
| | 5 | ealMic ~ 602k |
| | 6 | alMich ~ 602l |
| | 7 | lMiche ~ 602m |
| #####_# (513h) | 1 | Michel ~ 602n |

Rows: 604a–604n

MICHAEL — 652

| SHAPE APPLIED | ROTATION | |
|---|---|---|
| #### (513e) | 1 | Mich ~ 652a |
| | 2 | icha ~ 652b |
| | 3 | chae ~ 652c |
| | 4 | hael ~ 652d |
| | 5 | aelM ~ 652e |
| ###_# (513f) | 1 | Mica ~ 652f |
| ###### (513g) | 1 | Michae ~ 652g |
| | 2 | ichael ~ 652h |
| | 3 | chealM ~ 652i |
| | 4 | haelMi ~ 652j |
| | 5 | aelMic ~ 652k |
| | 6 | elMich ~ 652l |
| | 7 | lMicha ~ 652m |
| #####_# (513h) | 1 | Michal ~ 652n |

Rows: 650a–650n

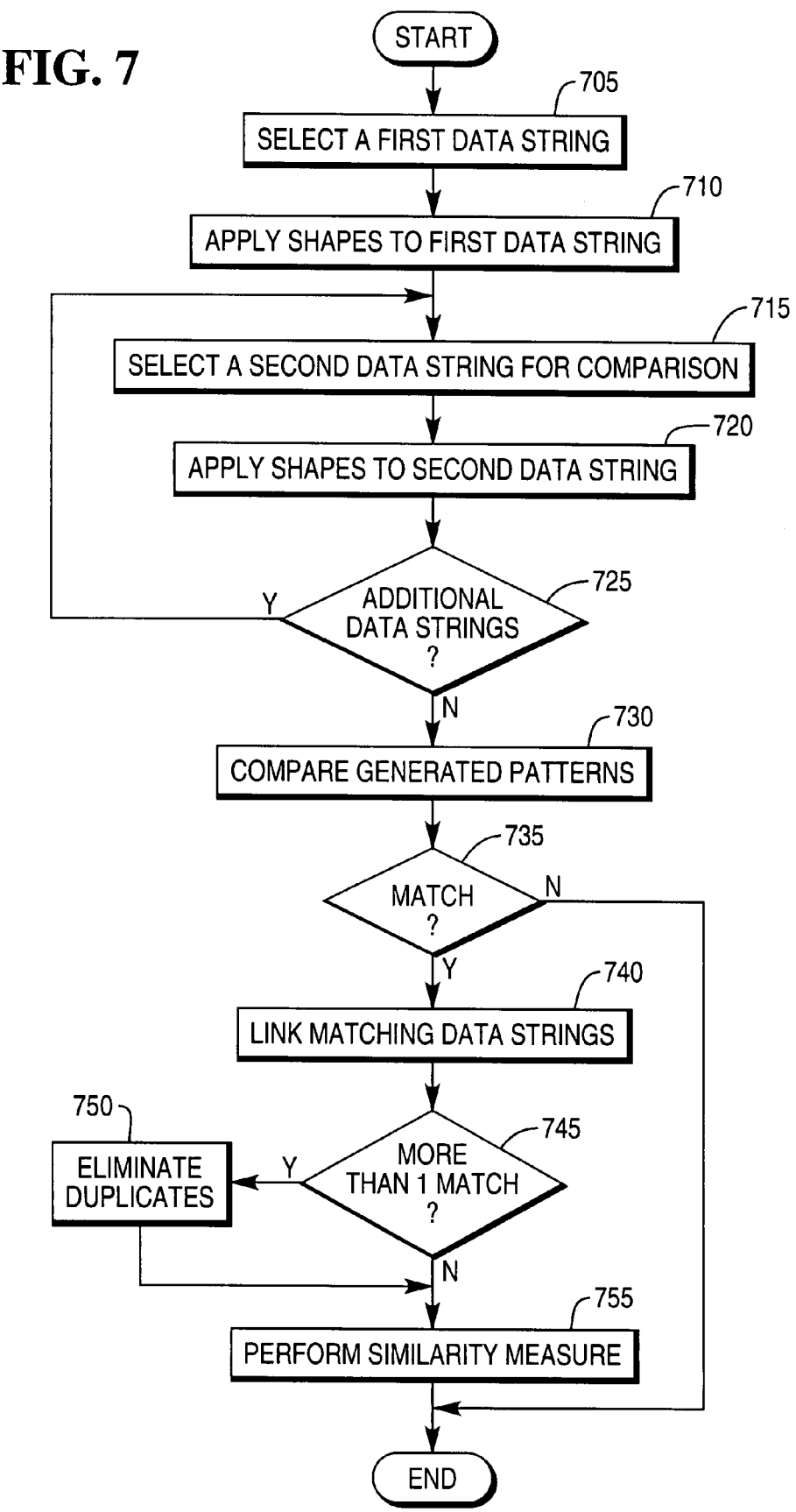

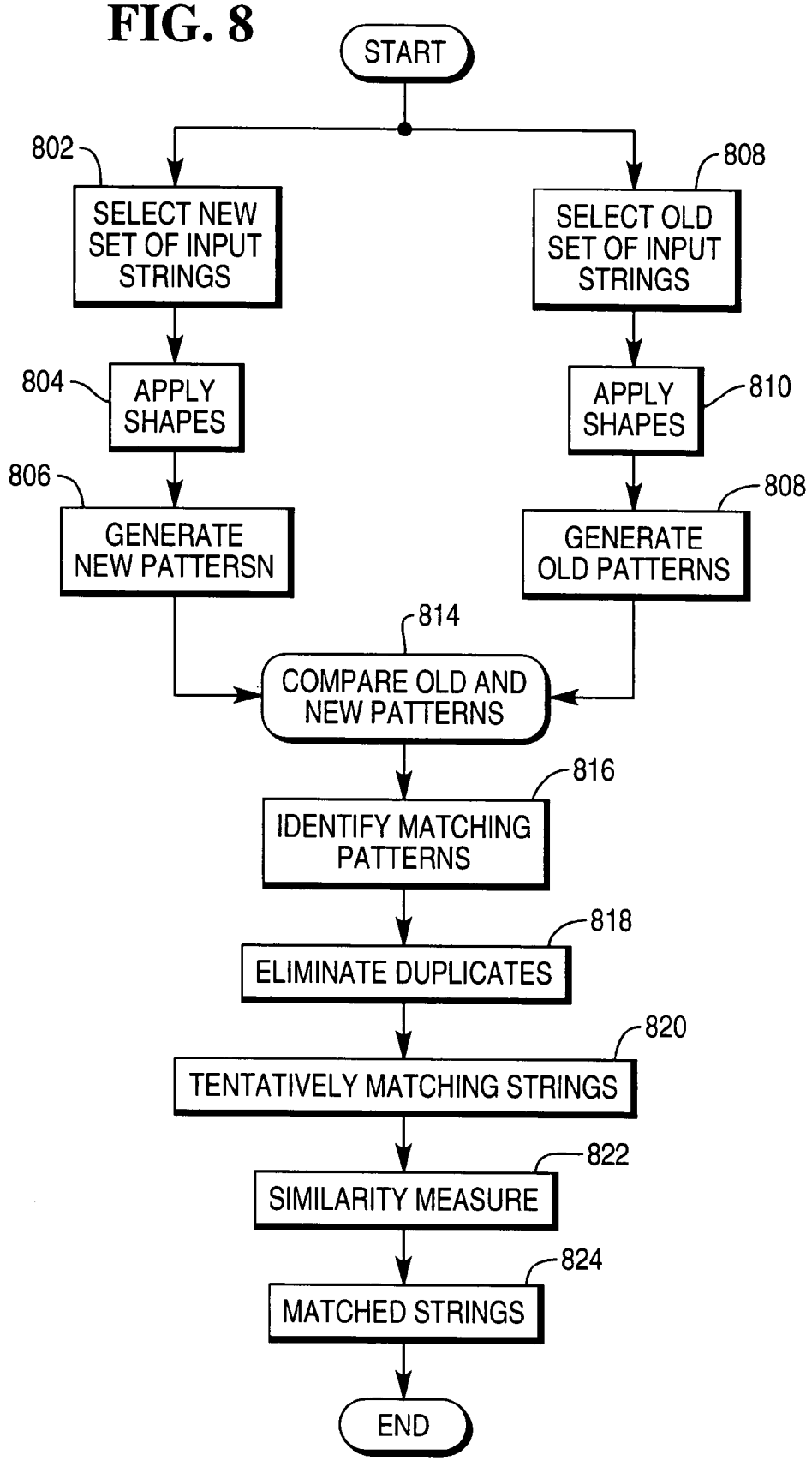

SIMILARITY STRING FILTERING

BACKGROUND

Records of information may be stored and maintained in relational database systems. When new records or data sets are received to be stored in the relational database system, the new records may be compared against the old records to determine whether any of the new records match the old records. Where a new record matches an old record, it may not be necessary to store the new record in the relational database system. In some instances, a new record (or, for that matter, an old record) may include a typographical error resulting from a data entry or editing error. For example, the new record may include one or more deleted characters, one or more inserted characters, one or more substituted characters, one or more sets of transposed characters, or a combination thereof. Although the new record may actually be a duplicate of an existing record, the variation between the new record and the old record, however minor, may prevent the system from matching the new and old records. Accordingly, both the old record and the new record may be stored in the relational database system. Furthermore, the error in the new record may go uncorrected for some period of time.

SUMMARY

In general, in one aspect, the invention features a method for optimizing similarity string filtering. The method includes selecting a first data string including one or more data characters and selecting a second data string including one or more data characters. At least one of a defined set of shapes is applied to the first data string to generate one or more patterns associated with the first data string. At least one of the defined set of shapes is applied to the second data string to generate one or more patterns associated with the second data string. The one or more patterns associated with the first data string are compared with the one or more patterns associated with the second data string to determine if one or more matching patterns exist. The first data string and the second data string are linked if one or more matching patterns exist.

Implementations of the invention may include one or more of the following. The one or more patterns associated with the first data string and the one or more patterns associated with the second data string are compared based on equality. A similarity measure may be performed on the linked first and second data strings. Performing the similarity measure may include calculating an edit distance for the first and second data strings. The edit distance may include a measure of the number of insertions, deletions, substitutions, or transpositions needed to transform the second data string into the first data string. The method may further include determining that a plurality of matching patterns exist and eliminating all duplicate matching patterns. Eliminating all duplicate matching patterns may include performing a DISTINCT function. The method may further include selecting the defined set of shapes based upon a desired error tolerance and the number of data characters in the first data string. Each shape in the defined set of shapes may include one or more data characters. The number of data characters in each shape may be related to the number of data characters in the first data string and the number of characters in the second data string. The first data string may include a first number of data characters and the second data string may include a second number of data characters. The at least one of the defined set of shapes applied to the first data string may be the same as the at least one of the defined set of shapes applied to the second data string. The defined set of shapes may operate to embed a length filter into the one or more patterns associated with the first data string and the one or more patterns associated with the second data string. Applying the at least one of the defined set of shapes to the first data string may include rotating the at least one of the defined set of shapes through the first data string. The at least one of the defined set of shapes may be of a length of one or more characters, and the length may operate to generate a maximum number of unique patterns associated with the first data string when the at least one of the defined set of shapes is applied to the first data string. The length may further operate to generate a maximum number of unique patterns associated with the second data string when the at least one of the defined set of shapes is applied to the second data string.

In general, in one aspect, the invention features a method for optimizing similarity string filtering. The method includes selecting a first set of data strings. Each data string including one or more data characters. At least one of a defined set of shapes is applied to the first set of data strings to generate a first set of patterns associated with the first set of data strings. The method further includes selecting a second set of data strings. Each data string including one or more data characters. At least one of the defined set of shapes is applied to the second set of data strings to generate a second set of patterns associated with the second set of data strings. The first set of patterns are compared with the second set of patterns to determine at least one matching pattern. A matching pattern includes at least one pattern from the first set of patterns and at least one pattern from the second set of patterns. A first data string associated with the at least one pattern from the first set of patterns in the matching pattern is linked with a second data string associated with the at least one pattern from the second set of patterns in the matching patterns.

Implementations of the invention may include one or more of the following. The first set of patterns associated with the first set of data strings and the second set of patterns associated with the second set of data string may be compared based on equality. The method may further include performing a similarity measure on the linked first and second data strings. Performing the similarity measure may include calculating an edit distance for the linked first and second data strings. The edit distance may include a measure of the number of insertions, deletions, substitutions, or transpositions needed to transform the second data string into the first data string. The method may further include determining that a plurality of matching patterns exist and eliminating all duplicate matching patterns. Eliminating all duplicate matching patterns may include performing a DISTINCT function. The method may further include selecting the defined set of shapes based upon a desired error tolerance and the number of data characters in each data string in the first set of data strings. Each shape in the defined set of shapes may include one or more data characters. The number of data characters in each shape may be related to the number of data characters in the each data string in the first set of data string and the number of characters in each data string in the second set of data strings. Each data string in the first set of data strings may include a first number of data characters, and each data string in the second set of data strings may include a second number of data characters. The at least one of the defined set of shapes applied to the first set of data strings may be the same as the at least one of the defined set of shapes applied to the second set of data strings. The defined set of shapes may operate to embed a length filter into the first and second sets of patterns. Applying the at least one of the defined set of shapes to the first set of data strings may include rotating the at least one of the defined set of shapes through each of data string in the first set data strings. The at least one of the defined set of shapes may include a length of one or more characters, and the length may operate to generate a maximum number of unique patterns associated with the first set of data strings when the at least one of the defined set of shapes is applied to the first set of data strings. The length may further operate to generate a maximum number of unique patterns associated with the second set of data strings when the at least one of the defined set of shapes is applied to the second set of data strings.

In general, in another aspect, the invention features a database system including a massively parallel processing system including one or more nodes, a plurality of CPUs, each of the one or more nodes providing access to one or more CPUs, a plurality of data storage facilities each of the one or more CPUs providing access to one or more data storage facilities, and a table, the table being stored on one or more of the data storage facilities, the table including one or more rows. The database system includes an optimizer for optimizing similarity string filtering. The optimizer includes a process for selecting a first data string including one or more data characters and selecting a second data string including one or more data characters. The optimizer further includes a process for applying at least one of a defined set of shapes to the first data string to generate one or more patterns associated with the first data string and a process for applying at least one of the defined set of shapes to the second data string to generate one or more patterns associated with the second data string. The one or more patterns associated with the first data string are compared with the one or more patterns associated with the second data string to determine if one or more matching patterns exist. The optimizer further includes a process for linking the first data string and the second data string if one or more matching patterns exist.

In general, in another aspect, the invention features a database system including a massively parallel processing system including one or more nodes, a plurality of CPUs, each of the one or more nodes providing access to one or more CPUs, a plurality of data storage facilities each of the one or more CPUs providing access to one or more data storage facilities, and a table, the table being stored on one or more of the data storage facilities, the table including one or more rows. The database system includes an optimizer. The optimizer includes a process for optimizing similarity string filtering. The optimizer is operable to select a first set of data strings. Each data string includes one or more data characters. The optimizer applies at least one of a defined set of shapes to the first set of data strings to generate a first set of patterns associated with the first set of data strings. The optimizer further selects a second set of data strings, each data string including one or more data characters. The optimizer further applies at least one of the defined set of shapes to the second set of data strings to generate a second set of patterns associated with the second set of data strings. The optimizer further compares the first set of patterns with the second set of patterns to determine at least one matching pattern, where a matching pattern includes at least one pattern from the first set of patterns and at least one pattern from the second set of patterns. The optimizer further links a first data string associated with the at least one pattern from the first set of patterns in the matching pattern and a second data string associated with the at least one pattern from the second set of patterns in the matching patterns.

In general, in another aspect, the invention features a computer program, stored on a tangible storage medium, for optimizing similarity string filtering. The program includes executable instructions that cause a computer to select a first data string including one or more data characters and a second data string including one or more data characters. The program further includes executable instructions that cause a computer to apply at least one of a defined set of shapes to the first data string to generate one or more patterns associated with the first data string and apply at least one of the defined set of shapes to the second data string to generate one or more patterns associated with the second data string. The program further includes executable instructions that cause a computer to compare the one or more patterns associated with the first data string with the one or more patterns associated with the second data string to determine if one or more matching patterns exist and link the first data string and the second data string if one or more matching patterns exist.

In general, in another aspect, the invention features a computer program, stored on a tangible storage medium, for optimizing similarity string filtering. The program includes executable instructions that cause a computer to select a first set of data strings. Each data string includes one or more data characters. The program includes executable instructions that cause a computer to apply at least one of a defined set of shapes to the first set of data strings to generate a first set of patterns associated with the first set of data strings. The program further includes executable instructions that cause a computer to select a second set of data strings, each data string including one or more data characters. The program further includes executable instructions that cause a computer to apply at least one of the defined set of shapes to the second set of data strings to generate a second set of patterns associated with the second set of data strings. The program further includes executable instructions that cause a computer to compare the first set of patterns with the second set of patterns to determine at least one matching pattern, where a matching pattern includes at least one pattern from the first set of patterns and at least one pattern from the second set of patterns. The program further includes executable instructions that cause a computer to link a first data string associated with the at least one pattern from the first set of patterns in the matching pattern and a second data string associated with the at least one pattern from the second set of patterns in the matching patterns.

BRIEF DESCRIPTION OF THE DRAWINGS

FIGS. 5A-5B are representations of example shapes that may be used to performing similarity string filtering based on a desired error tolerance.

FIGS. 6A-6B are representations of example patterns generated during similarity string filtering.

FIG. 7 is a flowchart of an example method for similarity string filtering.

FIG. 8 is a flow chart of an example method for performing similarity string filtering on sets of input strings.

DETAILED DESCRIPTION

Similarity measure processes use functions, such as edit distance functions, to identify records that match in spite of variations between them. These similarity measure functions may be expensive in terms of processing time or some other resource. The similarity string filtering techniques described herein reduce the number of times that the similarity measure functions are executed, which makes the processing more efficient. Optimized similarity string filtering techniques operate to pre-filter data sets of records such that only a subset of the records need be submitted to the similarity measure processes. Specifically, shapes may be applied to each new record to generate new patterns of data and each old record to generate old patterns of data. The generated patterns for each record may be compared based on equality to determine which pairs of old records and new records should be submitted to the similarity measure process. The shapes may be selected to maximize the size of the generated patterns and to minimize the number of matching patterns. The shapes may also be selected such that the generated patterns are within a desired error tolerance. Pattern matching allows relational database systems, such as the Teradata Active Data Warehousing System available from NCR Corporation, the assignee of the present invention, to match data entries that vary from each other due to data entry mistakes or other errors. Where appropriate, a DISTINCT function may be applied to the matching patterns to eliminate any duplicate matching pattern sets, and a similarity measure may be performed on the matching pattern sets. Because the records are filtered, the number of records on which the similarity measure is performed may be reduced. Additionally, partitioned parallel distribution may be improved.

Figure 1:
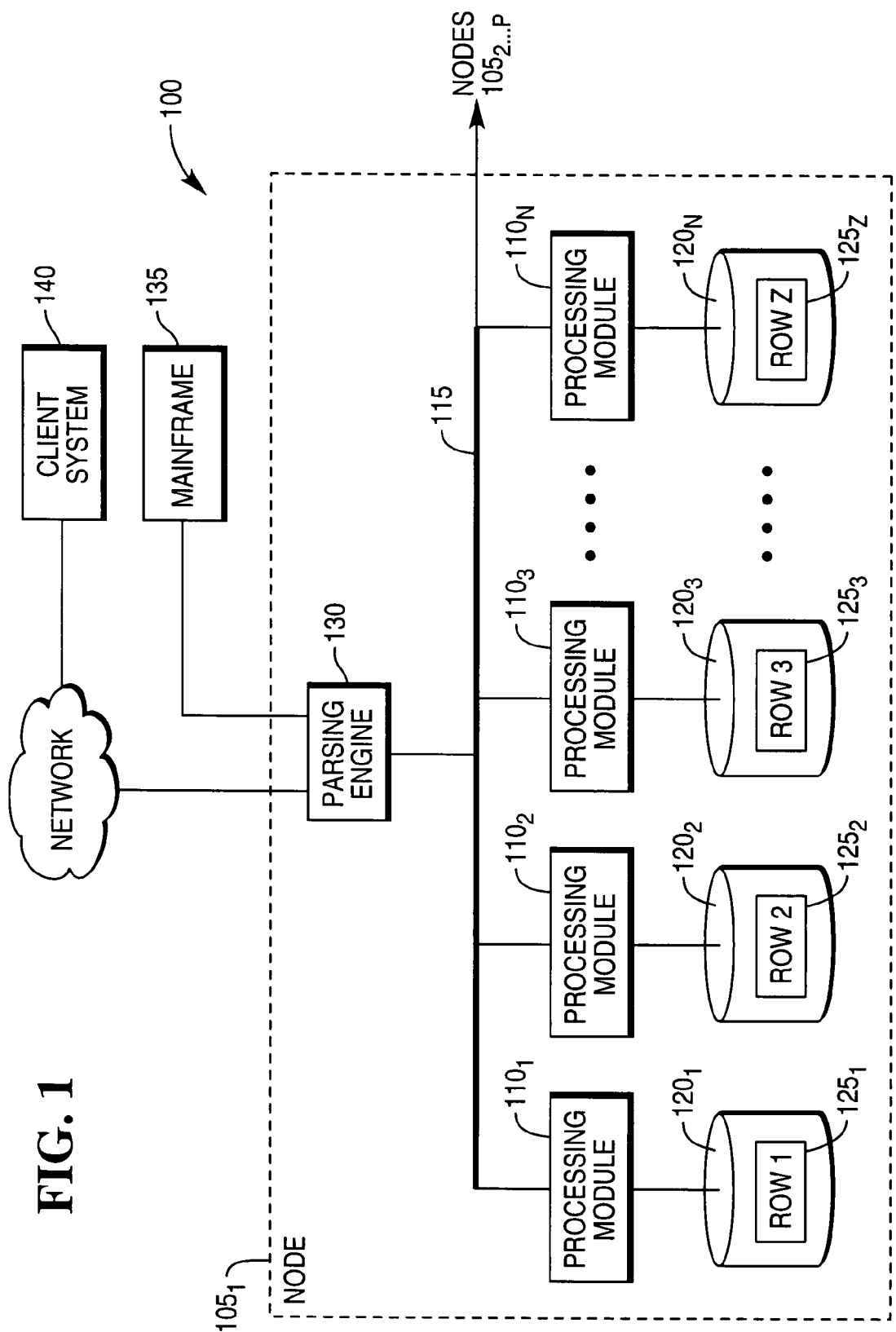
FIG. 1 is a block diagram of a node of a database system.

The similarity string filtering techniques disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
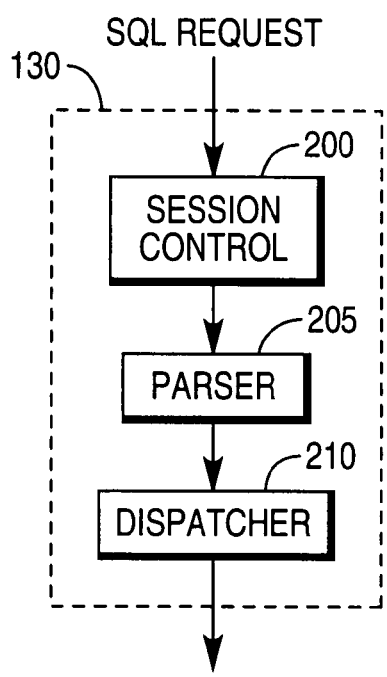
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
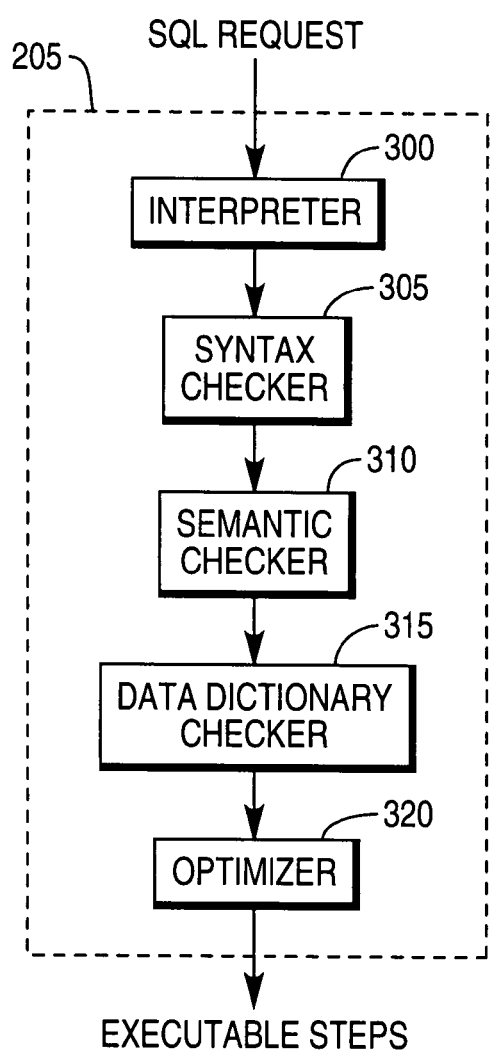
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
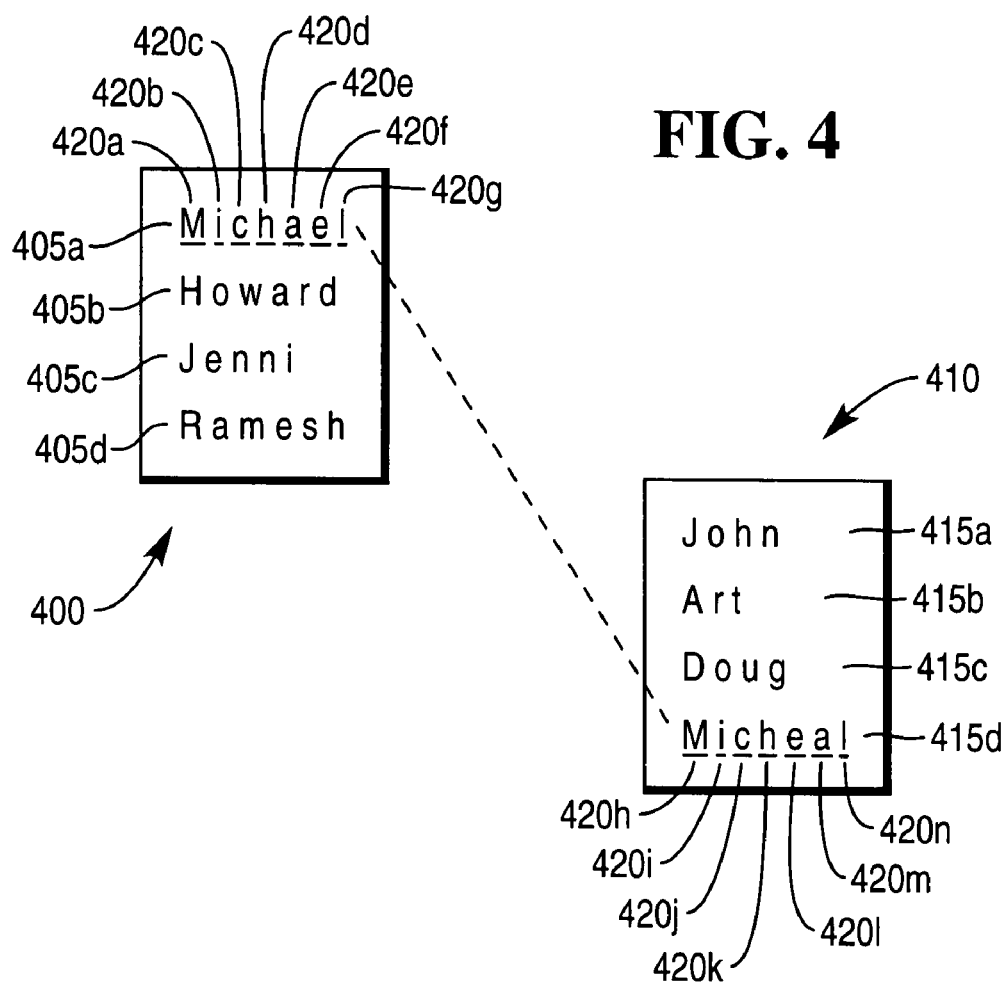
FIG. 4 is a representation of a set of example error strings that may be generated for an original data string.

The system may perform similarity string filtering on two sets of input strings of data. For example, FIG. 4 illustrates two example data sets of records on which similarity string filtering may be performed. A first data set 400 includes multiple first data strings 405. Specifically, first data set 400 is comprised of four data strings 405a-d representing the names: Michael, Howard, Jenni, and Ramesh. For example purposes only, it may be assumed that data strings 405a-d are currently stored in database system 100. A second data set 410 also includes multiple second data strings 415. Specifically, second data set 410 is comprised of four data strings 415a-d representing the names: John, Art, Doug, and Micheal. It may be assumed for example purposes that second data set 410 includes new data strings 410 that are to be incorporated into database system 100.

Although first and second data sets 400 and 410 are illustrated as each including a list of names, first and second data sets 400 and 410 may include any other appropriate data. For example, first and second data sets 400 and 410 may include addresses, order numbers, item numbers, item descriptions, or any other appropriate information stored in database system 100. Additionally, although first and second data sets 400 and 410 are illustrated as each including four data strings 405a-d and 415a-d, first and second data sets 400 may include any number of data strings and need not include the same number of data strings.

Each data string 405 and 415 is comprised of a string of characters 420. For example, as illustrated, data string 405a includes seven characters 420a-g: Michael. Data string 415d also includes seven characters 420h-n: Micheal. However, data strings 405 and 415 may include any number of characters 420 appropriate for representing the particular data included in data strings 405 and 415. For the illustrated example, similarity string filtering techniques may be used to reduce the times that strings from data set 400 and data set 410 must be submitted to the similarity measure function to determine that data string 405a and data string 415d are actually matching data strings despite a transposition of characters $420_l$ and $420m$ in data string 415d. The transposition of characters $420_l$ and $420m$ may result from a misspelling or typographical error during data entry. Similarity string filtering also reduces the number of invocations of similarity measure function processing to detect the occurrence of other errors, such as the deletion of characters 420, the insertion of characters 420, the substitution of characters 420 with alternative characters 420, or any other type of error that may result from data entry or data editing. Accordingly, similarity string filtering may also be used where data string 415e includes a deletion, such as Mihael; an insertion, such as Micchael; a substitution, such as Midhael; or another type of error.

Shapes may be applied to each data string 405 and 415. The shapes may be selected as a function of error tolerance. Error tolerance is the number of error operations that must be applied to the original data string to produce the error string. Accordingly, error tolerance is the number of insertions, deletions, substitutions, or transposition operations that can occur on the data characters of a given original string and still produce an error string that can be matched to the original string. For the above example, only one transposition of characters occurs in the data string 415d comprising "Micheal." Specifically, character 420l and character 420m are transposed. Thus, the error would be detected by a system with an error tolerance of one. Further, a data string 415d that includes two sets of transpositions, for example, would require a system with an error tolerance of two or more to detect the errors. An example of data string 415d including two sets of character transpositions might be "Mciheal."

For a given error tolerance, shapes may be applied to data strings 405 and 415 for comparison purposes. FIGS. 5A and 5B list possible shape definitions that may be applied to data strings 405 and 415. Specifically, FIG. 5A is a table 500 of possible shapes 502 that may be applied where matches are desired for an error tolerance of one. FIG. 5B is a table 504 of possible shapes 506 that may be applied where matches are desired for an error tolerance of two. Shapes may be selected from tables 500 and 504 as desired and applied to data strings 405 and 415 to generate associated patterns that may be used for similarity filtering. Although the generation of patterns will be discussed in more detail below with regard to FIGS. 6A and 6B, patterns may be generally described as "n-grams" where "n" is the number of data characters in a given pattern. Thus, a pattern that includes two data characters is a "bi-gram," and a pattern that includes three data characters is a "tri-gram." The shapes 502 and 506 defined in tables 500 and 504, respectively, may be derived based on an exhaustive evaluation of the combinations of errors that may be introduced by the possible edit operations and may be based, in some part, on trial and error. The shapes to be applied to a given data string 405 or 415 may be selected from tables 500 and 504 to maximize the size of the n-gram shape, "n," for the generated patterns while minimizing the number of matching patterns.

For a given data string 405 or 415, tables 500 and 504 may identify shapes of variable data string lengths. By allowing the shapes to vary in length, longer shapes may be applied to longer data strings to create more distinct patterns. Allowing the shapes to vary in length reduces the skew and number of comparisons that must be made during similarity string filtering. Additionally, applying multiple shape lengths to a single data string 405 or 415 results in the embedding of a length filter directly into the equality comparison. A selected shape that is three characters long may be applied to a data string 405 or 415 having a string length of five characters to result in a tri-gram pattern. As another example, a selected shape that is four characters long may be applied to a data string having a string length of seven characters to result in a quad-gram. Because the resulting tri-grams and quad-grams are not matched to one another, selecting multiple shape lengths results in generated patterns that will not qualify the similarity filter.

As described above, the shapes 502 or 506 to be applied to a particular data string 405 or 415 may be selected from tables 500 and 504 for a given error tolerance. Thus, where an error tolerance of one is desired, table 500 may be used. Alternatively, where an error tolerance of two is desired, table 504 may be used. Tables 500 and 504 each include a column for start lengths 508 and 510, respectively, and stop lengths 512 and 514, respectively. Start lengths 508 and 510 include the minimum string lengths to which the particular shape 502 or 506 should be applied. In contrast, stop lengths 512 and 514 include the maximum string lengths to which the particular shape 502 or 506 should be applied. From the desired table 500 or 504, one or more rows 513 and 515 may be selected for a particular data string 405 or 415 based on the string length of the particular data string 405 or 415. As discussed above, the string length of a data string 405 or 415 is the number of characters in the particular data string 405 or 415. Accordingly, because data string 415d includes seven characters ("Micheal"), the string length of data string 415d is seven. The string length of a particular data string 405 or 415 can be compared to start lengths 508 or 510 and stop lengths 508 or 514 to select the rows 513 or 515 appropriate for the data string 405 or 415. Thus, where an error tolerance of one is desired, rows 513e-h may be selected as including shapes 502 that should be applied to data string 415d ("Micheal"), which includes seven characters. Accordingly, table 500 indicates that the following shapes should be applied to data string 415d to generate patterns for similarity matching: ####, ###_#, ######, and #####_#, where the # indicates that a corresponding character from the data string is to be accepted and the underscore character indicates a gap and that the corresponding character from the data string should be skipped. Tables 500 and 510 also include a transposition operator (#,#) indicating that the two characters are transposed.

Shapes may include subshapes. For example, the shape #_# includes two subshapes, one on each side of the gap. The shape #(#,#) includes three subshapes, one for the first character and the other two for the transposed characters.

The one or more rows 513 or 515 selected as appropriate for a particular data string 405 or 415 include additional information relevant for generating patterns for the particular data string 405 or 415. For example, S1 516 and S1 518 define the starting character offset of the first subshape in a pattern when generated using error tolerances of one and two, respectively. Similarly, S2 520 and S2 522 define the starting character offsets of subshape 2 when generated using error tolerances of one and two, respectively. For error tolerances of two, S3 and S4 define the starting character offsets of subshapes 3 and 4, respectively. L1 524 and L1 526 define the lengths of subshapes 1 when generated using error tolerances of one and two, respectively. Similarly, L2 528 and L2 530 define the lengths of subshapes 2 when generated using error tolerances of one and two, respectively. For error tolerances of two, L3 and L4 define the lengths of subshapes 3 and 4, respectively.

Patterns are generated by applying the shapes to the data strings first in one position and then after shifting the pattern (with wrapping) with respect to the other data string repeatedly. Stops 540 and 542 indicate the character position at which pattern generation through rotation may be stopped for the given error tolerances of one and two, respectively. A negative stop 540 or 542 indicates an absolute position. Thus, a negative stop 540 or 542 results in a shape 502 or 504 being rotated through data string 405 or 415 as many times as the absolute value of the particular stop 540 or 542. For example, row 513*e* indicates that shape 502*e* (####) should be applied to data string 415*d*. The particular stop 540 associated with row 513*e* is a value of −5. Accordingly, stop 540 for row 513*e* indicates that shape 502*e* (####) may be rotated through data string 415*d* five times. As another example, stop 540 associated with row 513*f* is a value of −1. Thus, shape 540*f* (###_#) need only be rotated through data string 415*d* once.

By contrast, a positive stop 540 or 542 indicates a position that is relative to the length of the data string to which shape 502 or 406 is being applied. Thus, a shape with a positive stop 540 or 542 may be rotated through data string 405 or 415 as many times as there are characters in the particular data string 405 or 415. For example, assume that row 513*d* shape 502*d* (##_#) is applied to data string 405*c* ("Jenni"). The stop 540 associated with row 513*d* has a value of 0. Because stop 540 is considered a positive value, shape 502*d* (##_#) should be rotated through the particular data string 405 or 415 as many times as there are characters in the particular data string 405 or 415. Thus, shape 502*d* (##_#) would be rotated five times through data string 405*c* ("Jenni") with wrapping. As another example, shape 502*d* (##_#) would be rotated three times through data string 415*b* ("Art"), again, with wrapping.

Tables 500 and 504 also include columns for generated n-gram patterns 544 and 546, respectively. Generated n-gram patterns 544 and 546 indicate the number of patterns that are generated by applying a shape 502 or 506 to a given data string. Accordingly, the particular value of generated n-gram patterns 544 or 546 may be associated with the number of times that a particular shape 502 or 506 should be rotated through a given data string 405 or 415. For the above described example, stop 540 indicates that shape 502*e* (####) associated with row 513*e* should be rotated through data string 415*d* ("Micheal") five times. As such, table 500 indicates that five n-gram patterns may be generated by properly applying shape 502*e* (####) to data string 415*d* ("Micheal"). Where stop 540 or 542 is a positive value, the value of generated n-gram patterns 544 and 546 is indicated as a range. As stated above, the number of generated n-gram patterns 544 and 546 corresponds to the number of times that a particular shape 502 or 506 should be rotated through a given data string 405 or 415. Because the number of times that a particular shape 502 or 506 should be rotated through a given data string 405 or 415 corresponds with the length of the particular data string 405 or 415, however, the number of generated n-gram patterns 544 and 546 for a row 513 or 515 that includes a positive stop value 540 or 542 also corresponds with the length of the particular data string 405 or 415. For the above described example for data string 504*c*, stop 540 indicates that shape 502*d* (##_#) should be rotated through data string 405*c* ("Jenni") five times. Accordingly, table 500 indicates that five n-gram patterns may be generated by properly applying the shape 502*d* (##_#) to data string 405*c* ("Jenni"). As another example, table 500 indicates that three n-gram patterns may be generated by properly applying the shape 502*d* (##_#) to data string 415*b* ("Art").

As described above, tables 500 and 504 may be used to identify shapes 502 and 506, respectively, for a given error tolerance and a given data string. The shapes are then applied to data strings 405 and 415 in data sets 400 and 410, respectively, to generate patterns for each data string 405 and 415. FIGS. 6A-6B are included for example purposes. Specifically, FIGS. 6A-6B summarize the patterns generated when appropriate shapes from table 500 are applied to data string 405*a* ("Michael") and data string 415*d* ("Micheal"), respectively. FIGS. 6A-6B show the result of applying patterns to data string 405*a* ("Michael") and data string 415*d* ("Micheal"), which are variations of the same name that may result from a typographical error. However, it is noted that appropriate shapes should be selected from tables 500 and 504 for each data string 405 and 415.

As described above with regard to FIGS. 5A and 5B, where an error tolerance of one is desired, rows 513*e-h* have been identified as being applicable to data string 415*d* ("Micheal") since data string 415*d* ("Micheal") has a length of seven characters. FIG. 6A includes a table 600 summarizing the patterns 602 generated from the application of the particular shapes 502*e-h* (####, ###_#, ######, #####_#) associated with rows 513*e-h* to data string 415*d* ("Micheal"). The information in table 600 is arranged in rows 604*a-n*. Specifically, rows 604*a-e* summarize the patterns 602*a-e* generated from the application of shape 502*e* (####) to data string 415*d* ("Micheal"). Because table 500 indicates that shape 502*e* (####) should be rotated through data string 415*d* five times, there are five rows 604*a-e* in table 600 associated with shape 502*e* (####). Thus, each row 604*a-e* summarizes the generated patterns 602*a-e* for a particular rotation of shape 502*e* (####) through data string 415*d* ("Micheal"). For example, generated pattern 602*a* ("Mich") results where the first character of shape 502*e* (####) corresponds with the first character of data string 415*d* ("Micheal"). Accordingly, the four characters of generated pattern 602*a* ("Mich") are also the first four characters of data string 415*d* ("Micheal"). As another example, generated pattern 602*b* ("iche") results where the first character of shape 502*e* (####) corresponds with the second character of data string 415*d* ("Micheal"). Accordingly, the four characters of generated pattern 602*b* ("iche") are the second, third, fourth, and fifth characters of data string 415*d* ("Micheal"). Patterns 602*c-e* may be generated.

Row 604*f* summarizes the generated pattern 602*f* when shape 502*f* (###_#) of table 500 is applied to data string 415*d* ("Micheal"). Because table 500 indicates that shape 502*f* (###_#) indicates that shape 502*f* (###_#) should only be rotated once through data string 415*d* ("Micheal"), there is only one row 604*f* in table 600 associated with shape 502*f* (###_#). Thus, generated pattern 602*f* ("Mice") results where the first character of shape 502*f* (###_#) corresponds with the first character of data string 415*d* ("Micheal"). The first through fourth characters of generated pattern 602*f* ("Mice") are the first, second, third, and fifth characters of data string 415*d* ("Micheal"). As indicated by the underscore in shape 502*f* (###_#), the fourth character of data string 415*d* ("Micheal") has been deleted.

Rows 604*g-m* summarize the generated patterns 602*g-m* when shape 502*g* (######) of table 500 is applied to data string 415*d* ("Micheal"). Because table 500 indicates that shape 502*g* (#####) indicates that shape 502*g* (######) should be rotated through data string 415*d* ("Micheal") seven times, there are seven rows 604*g-m* in table 600 that are associated with shape 502*g* (######). Each row 604*g-m* summarizes the generated patterns 602*g-m* for a particular rotation of shape 502*e* (#######) through data string 415*d* ("Micheal"). For example, generated pattern 602*g* ("Michea") results where the first character of shape 502*g* (####) corresponds with the first character of data string 415*d* ("Micheal"). Accordingly, the six characters of generated pattern 602*g* ("Michea") are also the first six characters of data string 415*d* ("Micheal"). As another example, generated pattern 602*h* ("Icheal") results where the first character of shape 502*g* (######) corresponds with the second character of data string 415*d* ("Micheal"). Accordingly, the six characters of generated pattern 602*h* ("Icheal") are the second, third, fourth, fifth, sixth, and seventh characters of data string 415*d* ("Micheal"). Patterns 602*i-m* may be generated in a similar fashion.

Row 604*n* summarizes the generated pattern 602*n* when shape 502*h* (#####_#) of table 500 is applied to data string 415*d* ("Micheal"). Because table 500 indicates that shape 502*h* (#####_#) should only be rotated once through data string 415*d* ("Micheal"), there is only one row 604*n* in table 600 associated with shape 502*h* (#####_#). Thus, generated pattern 602*n* ("Michel") results where the first character of shape 502*h* (######) corresponds with the first character of data string 415*d* ("Micheal"). Accordingly, the first through sixth characters of generated pattern 602*n* ("Micheal") are the first, second, third, fourth, fifth, and seventh characters of data string 415*d* ("Micheal"). As indicated by the underscore in shape 502*h* (####_#), the sixth character of data string 415*d* ("Micheal") has been deleted.

As described above, shapes 502*e-h* are also appropriately applied to data string 405*a* ("Michael"). FIG. 6B includes a table 650 summarizing the patterns 652 generated from the application of the particular shapes 502*e-h* (####, ###_#, ###### #####_#) associated with rows 513*e-h* of table 500 to data string 405*a* ("Michael"). The information in table 650 is arranged in rows 654*a-n*. Specifically, rows 654*a-e* summarize the patterns generated 652*a-e* from the application of shape 502*e* (####) to data string 405*a* ("Michael"). Because table 500 indicates that shape 502*e* (####) should be rotated through data string 405*a* five times, there are five rows 654*a-e* in table 650 associated with shape 502*e* (####). Thus, each row 654*a-e* summarizes the generated patterns 652*a-e* for a particular rotation of shape 502*e* (####) through data string 405*a* ("Michael"). For example, generated pattern 652*a* ("Mich") results where the first character of shape 502*e* (####) corresponds with the first character of data string 405*a* ("Michael"). Accordingly, the four characters of generated pattern 652*a* ("Mich") are also the first four characters of data string 405*a* ("Michael"). As another example, generated pattern 652*b* ("Icha") results where the first character of shape 502*e* (####) corresponds with the second character of data string 405*a* ("Michael"). Accordingly, the four characters of generated pattern 652*b* "(Icha") are the second, third, fourth, and fifth characters of data string 405*a* ("Michael"). Patterns 652*c-e* may be generated in a similar fashion.

Row 654*f* summarizes the generated pattern 652*f* when shape 502*f* (###_#) of table 500 is applied to data string 405*a* ("Michael"). Because table 500 indicates that shape 502*f* (###_#) should only be rotated once through data string 405*a* ("Michael"), there is only one row 654*f* in table 650 associated with shape 502*f* (###_#). Thus, generated pattern 652*f* ("Mica") results where the first character of shape 502*f* (###_#) corresponds with the first character of data string 405*a* ("Michael"). The first through fourth characters of generated pattern 652*f* ("Mica") are the first, second, third, and fifth characters of data string 405*a* ("Michael"). As indicated by the underscore in shape 502*f* (###_#), the fourth character of data string 405*a* ("Michael") has been deleted.

Rows 654*g-m* summarize the generated patterns 652*g-m* when shape 502*g* (######) of table 500 is applied to data string 405*a* ("Michael"). Because table 500 indicates that shape 502*g* (######) indicates that shape 502*g* (######) should be rotated through data string 405*a* ("Michael") seven times, there are seven rows 654*g-m* in table 650 that are associated with shape 502*g* (######). Each row 654*g-m* summarizes the generated patterns 652*g-m* for a particular rotation of shape 502*e* (#######) through data string 405*a* ("Michael"). For example, generated pattern 652*g* ("Michae") results where the first character of shape 502*g* (####) corresponds with the first character of data string 405*a* ("Michael"). Accordingly, the six characters of generated pattern 652*g* ("Michae") are also the first six characters of data string 405*a* ("Michael"). As another example, generated pattern 652*h* ("Ichael") results where the first character of shape 502*g* (######) corresponds with the second character of data string 405*a* ("Michael"). Accordingly, the six characters of generated pattern 652*h* "(Ichael") are the second, third, fourth, fifth, sixth, and seventh characters of data string 405*a* ("Michael"). Patterns 652*i-m* may be generated.

Row 654*n* summarizes the generated pattern 652*n* when shape 502*h* (#####_# of table 500 is applied to data string 405*a* ("Michael"). Because table 500 indicates that shape 502*h* (##_#) should only be rotated once through data string 405*a* ("Michael"), there is only one row 654*n* in table 600 associated with shape 502*h* (#####_#). Thus, generated pattern 652*n* ("Michal") results where the first character of shape 502*h* (###_#) corresponds with the first character of data string 405*a* ("Michael"). Accordingly, the first through sixth characters of generated pattern 652*n* ("Michal") are the first, second, third, fourth, fifth, and seventh characters of data string 405*a* ("Michael"). As indicated by the underscore in shape 502*h* (######), the sixth character of data string 405*a* ("Michael") has been deleted.

Although FIGS. 6A and 6B merely summarize the patterns generated by applying the shapes identified from table 500 to data string 405*a* ("Michael") and data string 415*d* ("Micheal"), it is recognized that patterns may be generated for all data strings 405 and 415 desired to be submitted to the similarity filter.

FIG. 7 illustrates a flow chart describing an example method for performing similarity string filtering. The method begins at step 705 where a first data string is selected. The first data string may comprise any data string 405 or 415 within data set 400 or data set 410, respectively. For example, first data string 405*a* ("Michael") may be selected.

At step 710, shapes are applied to the first data string. As was described above with regard to FIGS. 6A and 6B, shapes may be selected from tables 500 or 504 based on a desired error tolerance and the length of the first data string. Where an error tolerance of one is desired, table 500 may be used to select shapes 502 to apply to the first data string. For example, where an error tolerance of one is desired, the appropriate shapes from table 500 to apply to data string 405a ("Michael") include shape 502e (####), shape 502f (###_#), shape 502g (######), and shape 502h (#####_#) since data string 405a ("Michael") has a string length of seven characters. Conversely, where an error tolerance of two is desired, table 504 may be used to select shapes 506 to apply to the first data string. For example, where an error tolerance of two is desired, the appropriate shapes from table 504 to apply to data string 405a ("Michael") include shape 506n (####), shape 506o (###_#), shape 506p (###_#), shape 506q (##(#,#)), and shape 506r (#(#,#)#) since data string 405a ("Michael") has a string length of seven characters. The application of the appropriate shapes 502 or 506 to first data string 405 or 415 results in the generation of n-gram patterns. For example, the application of shapes 506n-r to data string 405a ("Michael") results in generated patterns 652a-n as summarized in Table 650 of FIG. 6B.

At step 715, a second data string is selected for comparison with the first data string. The second data string may comprise any data string 405 or 415 within data set 400 or data set 410, respectively, for which a comparison with the first data string is desired. For example, the second data string may comprise data string 415d ("Micheal"). At step 720, shapes are applied to second data string 405 or 415. Similar to the shapes applied to the first data string, the shapes may be selected from tables 500 or 504 based on a desired error tolerance and the length of the second data string. Where an error tolerance of one is desired, table 500 may be used to select shapes 502 to apply to the second data string. For example, where an error tolerance of one is desired, the appropriate shapes from table 500 to apply to data string 415d ("Micheal") include shape 502e (####), shape 502f (###_#), shape 502g (######), and shape 502h (#####_#) since data string 415d ("Micheal") has a string length of seven characters. Conversely, where an error tolerance of two is desired, table 504 may be used to select shapes 506 to apply to the second data string. For example, where an error tolerance of two is desired, the appropriate shapes from table 504 to apply to data string 415d ("Micheal") include shape 506n (####), shape 506o (###_#), shape 506p (###_#), shape 506q (##(#,#)), and shape 506r (#(#,#)#) since data string 415d ("Micheal") has a string length of seven characters. The application of the appropriate shapes 502 or 506 to second data string 405 or 415 results in the generation of n-gram patterns. For example, the application of shapes 506n-r to data string 415d ("Micheal") results in generated patterns 602a-n as summarized in Table 600 of FIG. 6A.

At step 725, a determination may be made as to whether there are additional data strings 405 or 415 to be compared with the first and second data strings. Where it is determined that there are additional data strings 405 or 415 to be compared, the method returns to steps 715 and 720 where another data string 405 or 415 is selected and shapes are applied to the selected data string 405 or 415. The method continues in this manner until shapes are applied to all of the data strings for which a comparison is desired.

At step 730, the patterns generated from the application of the appropriate shapes 502 or 506 to the first and second data strings are compared (as well as any additional patterns associated with additional data strings 405 or 415). Specifically, the generated patterns associated with the first and second data strings may be compared for equality. For example, if the first data string comprises data string 405a ("Michael") and the second data string comprises data string 415d ("Micheal"), generated patterns 602a-n and generated patterns 652a-n, as summarized in table 600 and 650, may be compared. At step 735, a determination may be made as to whether any of the generated patterns associated with the first data string match the generated patterns associated with the second data string. For example, if the first and second data strings comprise data string 405a ("Michael") and data string 415d ("Micheal"), respectively, and are associated with generated patterns 652a-n and 602a-n, respectively, it may be determined that patterns 602a ("Mich") and 652a ("Mich") are matching patterns. If at least one matching pattern is found, the method continues at step 740. Otherwise, the method terminates.

At step 740, the matching data strings are linked. More specifically, where a matching pattern is determined at step 735, the original data strings used to generate the matching patterns 602 or 652 are linked to one another. Thus, where, for example, it is determined that patterns 602a ("Mich") and 652a ("Mich") are matching patterns, data string 405a and 415d are linked to one another. The linking of data strings 405a ("Michael") and 415d ("Micheal") to one another indicates that data strings 405a and 415d most likely represent the same information. Thus, the variation in characters (in this case the transposition of the "e" and the "a" in data string 415d) are the probably result of data entry error or editing error.

At step 745, a determination is made as whether more than one set of matching patterns was identified in step 735 for the linked data strings. If more than one set of matching patterns was identified in step 735, any duplicate matching patterns will be eliminated at step 750. Accordingly, it is not necessary to link the two data strings more than once. Thus, if data string 405a ("Michael") results in two generated patterns 652 that match a generated pattern 602 of data string 415d ("Micheal"), data string 405a ("Michael") and data string 415d ("Micheal") need only be linked once. The duplicate matching pattern may be eliminated.

At step 755, a similarity measure may be performed between the linked data strings. In some instances, performing the similarity measure may include calculating the edit distance for the linked data strings. The edit distance may include a measure of the number of insertions, deletions, substitutions, or transpositions needed to transform the linked data strings into the same data string. For example, where data string 415d ("Micheal") and data string 405a ("Michael") are linked data strings, the edit distance is equal to one. In this particular example, the edit distance is equal to one since only one set of characters (the "e" and the "a") in data string 415d ("Micheal") need be transposed to result in data string 405a ("Michael").

FIG. 8 illustrates a flow chart describing an example method for performing similarity string filtering on two sets of input strings. At step 802, a new set of input strings is selected. The new set of input strings may comprise, for example, a list of records to be added to a database which already includes an existing set of records. In particular implementations, the new set of input strings may comprise data strings 415. At step 804, shapes are applied to the new set of input strings to generate new patterns 806. Where, for example, the set of new input strings includes data strings 415 and an error tolerance of one is desired, the appropriate shapes may be selected from table 500 for each data string 415. By contrast, where the set of new input strings includes data strings 415 and an error tolerance of two is desired, the appropriate shapes may be selected from table 504 for each data string 415.

Similar steps are performed with regard to an old set of input strings. Accordingly, an old set of input strings is selected at step 808. The old set of input strings may comprise, for example, a list of records already stored in the system. In particular implementations, the old set of input strings may comprise data strings 405. At step 810, shapes are applied to the old set of input strings to generate old patterns 812. Where, for example, the set of old input strings includes data strings 405 and an error tolerance of one is desired, the appropriate shapes may be selected from table 500 for each data string 405. By contrast, where the set of old input strings include data strings 405 and an error tolerance of two is desired, the appropriate shapes may be selected from table 504 for each data string 405.

Although FIG. 8 shows the generation of new patterns 806 from the set of new input strings prior to the generation of old patterns 812 from the set of old input strings, the generation of the respective sets of patterns may be reversed. Accordingly, either set of patterns may be generated before the other set of patterns, or the sets of patterns may be generated simultaneously.

At step 814, the new patterns 806 and the old patterns 812 are compared. The comparison may be made to determine any matching patterns 816. For example, if the new set of input strings includes data strings 415a-d and the old set of input strings includes data string 405a-d, it may be determined that patterns 602a ("Mich") and 652a ("Mich") are matching patterns.

At step 818, the matching patterns from step 816 are filtered to eliminate any duplicate patterns. The remaining matching patterns are associated with tentatively matching data strings 820. The tentatively matching data strings may be selected for a similarity measure function process at step 822. The similarity measure function then determines particular data strings from the new set of input strings that match to particular data strings from the old set of input strings despite variations in the matching data strings. Because duplicate matching patterns have been eliminated, however, only a subset of new input string and old input strings are submitted to the similarity measure function. Accordingly, the illustrated technique reduces the number of times that the similarity measure function is used on to compare the new set of input strings and the old set of input strings to determine matching data strings.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for optimizing similarity string filtering, the method comprising:
   selecting a first data string comprising one or more data characters;
   selecting a second data string comprising one or more data characters;
   applying at least one of a defined set of shapes to the first data string to generate one or more patterns associated with the first data string, each of the shapes in the defined set of shapes capable of being configured to apply an operation, where the operation is a skip operation, a transposition operation, or a stop operation;
   applying at least one of the defined set of shapes to the second data string to generate one or more patterns associated with the second data string;
   comparing the one or more patterns associated with the first data string with the one or more patterns associated with the second data string to determine if one or more matching patterns exist; and
   linking the first data string and the second data string if one or more matching patterns exist.

2. The method of claim 1, wherein the one or more patterns associated with the first data string and the one or more patterns associated with the second data string are compared based on equality.

3. The method of claim 1, further comprising performing a similarity measure on the linked first and second data strings.

4. The method of claim 3, wherein performing a similarity measure comprises calculating an edit distance for the first and second data strings, the edit distance comprising a measure of the number of insertions, deletions, substitutions, or transpositions needed to transform the second data string into the first data string.

5. The method of claim 1, further comprising:
   determining that a plurality of matching patterns exist; and
   eliminating all duplicate matching patterns.

6. The method of claim 5, wherein eliminating all duplicate matching patterns comprises performing a DISTINCT function.

7. The method of claim 1, further comprising:
   selecting the defined set of shapes based upon a desired error tolerance and the number of data characters in the first data string.

8. The method of claim 7, wherein each shape in the defined set of shapes comprises one or more data characters, the number of data characters in each shape related to the number of data characters in the first data string and the number of characters in the second data string.

9. The method of claim 1, wherein:
   the first data string is comprised of a first number of data characters and the second data string is comprised of a second number of data characters; and
   the at least one of the defined set of shapes applied to the first data string being is the same as the at least one of the defined set of shapes applied to the second data string.

10. The method of claim 9, wherein the defined set of shapes operate to embed a length filter into the one or more patterns associated with the first data string and the one or more patterns associated with the second data string.

11. The method of claim 1, wherein applying the at least one of the defined set of shapes to the first data string comprises rotating the at least one of the defined set of shapes through the first data string.

12. The method of claim 1, wherein the at least one of the defined set of shapes comprises a length of one or more characters, the length operable to generate a maximum number of unique patterns associated with the first data string when the at least one of the defined set of shapes is applied to the first data string.

13. The method of claim 12, wherein the length is operable to generate a maximum number of unique patterns associated with the second data string when the at least one of the defined set of shapes is applied to the second data string.

14. A method for optimizing similarity string filtering, the method comprising:
   selecting a first set of data strings, each data string comprising one or more data characters;

applying at least one of a defined set of shapes to the first set of data strings to generate a first set of patterns associated with the first set of data strings, each of the shapes in the defined set of shapes capable of being configured to apply an operation, where the operation is a skip operation, a transposition operation, or a stop operation;

selecting a second set of data strings, each data string comprising one or more data characters;

applying at least one of the defined set of shapes to the second set of data strings to generate a second set of patterns associated with the second set of data strings;

comparing the first set of patterns with the second set of patterns to determine at least one matching pattern, a matching pattern comprising at least one pattern from the first set of patterns and at least one pattern from the second set of patterns; and linking a first data string associated with the at least one pattern from the first set of patterns in the matching pattern and a second data string associated with the at least one pattern from the second set of patterns in the matching patterns.

15. The method of claim 14, wherein the first set of patterns associated with the first set of data strings and the second set of patterns associated with the second set of data string are compared based on equality.

16. The method of claim 14, further comprising performing a similarity measure on the linked first and second data strings.

17. The method of claim 16, wherein performing a similarity measure comprises calculating an edit distance for the linked first and second data strings, the edit distance comprising a measure of the number of insertions, deletions, substitutions, or transpositions needed to transform the second data string into the first data string.

18. The method of claim 14, further comprising:
determining that a plurality of matching patterns exist; and
eliminating all duplicate matching patterns.

19. The method of claim 18, wherein eliminating all duplicate matching patterns comprises performing a DISTINCT function.

20. The method of claim 14, further comprising:
selecting the defined set of shapes based upon a desired error tolerance and the number of data characters in each data string in the first set of data strings.

21. The method of claim 20, wherein each shape in the defined set of shapes comprises one or more data characters, the number of data characters in each shape related to the number of data characters in the each data string in the first set of data string and the number of characters in each data string in the second set of data strings.

22. The method of claim 14, wherein:
each data string in the first set of data strings is comprised of a first number of data characters and each data string in the second set of data strings is comprised of a second number of data characters; and
the at least one of the defined set of shapes applied to the first set of data strings is the same as the at least one of the defined set of shapes applied to the second set of data strings.

23. The method of claim 22, wherein the defined set of shapes operate to embed a length filter into the first and second sets of patterns.

24. The method of claim 14, wherein applying the at least one of the defined set of shapes to the first set of data strings comprises rotating the at least one of the defined set of shapes through each of data string in the first set data strings.

25. The method of claim 14, wherein the at least one of the defined set of shapes comprises a length of one or more characters, the length operable to generate a maximum number of unique patterns associated with the first set of data strings when the at least one of the defined set of shapes is applied to the first set of data strings.

26. The method of claim 25, wherein the length is operable to generate a maximum number of unique patterns associated with the second set of data strings when the at least one of the defined set of shapes is applied to the second set of data strings.

27. A computer program, stored on a tangible storage medium, for optimizing similarity string filtering, the program including executable instructions that cause a computer to:
select a first data string comprising one or more data characters;
select a second data string comprising one or more data characters;
apply at least one of a defined set of shapes to the first data string to generate one or more patterns associated with the first data string;
apply at least one of the defined set of shapes to the second data string to generate one or more patterns associated with the second data string, each of the shapes in the defined set of shapes capable of being configured to apply an operation, where the operation is a skip operation, a transposition operation, or a stop operation;
compare the one or more patterns associated with the first data string with the one or more patterns associated with the second data string to determine if one or more matching patterns exist; and
link the first data string and the second data string if one or more matching patterns exist.

28. The computer program of claim 27, wherein the one or more patterns associated with the first data string and the one or more patterns associated with the second data string are compared based on equality.

29. The computer program of claim 27, further including executable instructions that cause the computer to perform a similarity measure on the linked first and second data strings.

30. The computer program of claim 29, further including executable instructions that cause the computer to calculating an edit distance for the first and second data strings when performing a similarity measure, the edit distance comprising a measure of the number of insertions, deletions, substitutions, or transpositions needed to transform the second data string into the first data string.

31. The computer program of claim 27, further including executable instructions that cause the computer to:
determine that a plurality of matching patterns exist; and
eliminate all duplicate matching patterns.

32. The computer program of claim 31, further including executable instructions that cause the computer to perform a DISTINCT function when eliminating all duplicate matching patterns.

33. The computer program of claim 27, further including executable instructions that cause the computer to:
select the defined set of shapes based upon a desired error tolerance and the number of data characters in the first data string.

34. The computer program of claim 33, wherein each shape in the defined set of shapes comprises one or more data characters, the number of data characters in each shape related to the number of data characters in the first data string and the number of characters in the second data string.

35. The computer program of claim 27, wherein:
the first data string is comprised of a first number of data characters and the second data string is comprised of a second number of data characters; and
the at least one of the defined set of shapes applied to the first data string being is the same as the at least one of the defined set of shapes applied to the second data string.

36. The computer program of claim 35, wherein the defined set of shapes operate to embed a length filter into the one or more patterns associated with the first data string and the one or more patterns associated with the second data string.

37. The computer program of claim 27, further including executable instructions that cause the computer to rotate the at least one of the defined set of shapes through the first data string when applying the at least one of the defined set of shapes to the first data string.

38. The computer program of claim 27, wherein the at least one of the defined set of shapes comprises a length of one or more characters, the length operable to generate a maximum number of unique patterns associated with the first data string when the at least one of the defined set of shapes is applied to the first data string.

39. The computer program of claim 38, wherein the length is operable to generate a maximum number of unique patterns associated with the second data string when the at least one of the defined set of shapes is applied to the second data string.

40. A computer program, stored on a tangible storage medium, for optimizing similarity string filtering, the program including executable instructions that cause a computer to:
select a first set of data strings, each data string comprising one or more data characters;
apply at least one of a defined set of shapes to the first set of data strings to generate a first set of patterns associated with the first set of data strings, each of the shapes in the defined set of shapes capable of being configured to apply an operation, where the operation is a skip operation, a transposition operation, or a stop operation;
select a second set of data strings, each data string comprising one or more data characters;
apply at least one of the defined set of shapes to the second set of data strings to generate a second set of patterns associated with the second set of data strings;
compare the first set of patterns with the second set of patterns to determine at least one matching pattern, a matching pattern comprising at least one pattern from the first set of patterns and at least one pattern from the second set of patterns; and
link a first data string associated with the at least one pattern from the first set of patterns in the matching pattern and a second data string associated with the at least one pattern from the second set of patterns in the matching patterns.

41. The computer program of claim 40, wherein the first set of patterns associated with the first set of data strings and the second set of patterns associated with the second set of data string are compared based on equality.

42. The computer program of claim 40, further including executable instructions that cause a computer to perform a similarity measure on the linked first and second data strings.

43. The computer program of claim 42, further including executable instructions that cause a computer to calculate an edit distance for the linked first and second data strings when performing the similarity measure, the edit distance comprising a measure of the number of insertions, deletions, substitutions, or transpositions needed to transform the second data string into the first data string.

44. The computer program of claim 40, further including executable instructions that cause a computer to:
determine that a plurality of matching patterns exist; and
eliminate all duplicate matching patterns.

45. The computer program of claim 44, further including executable instructions that cause a computer to perform a DISTINCT function when eliminating all duplicate matching patterns.

46. The computer program of claim 40, further including executable instructions that cause a computer to:
select the defined set of shapes based upon a desired error tolerance and the number of data characters in each data string in the first set of data strings.

47. The computer program of claim 46, wherein each shape in the defined set of shapes comprises one or more data characters, the number of data characters in each shape related to the number of data characters in the each data string in the first set of data string and the number of characters in each data string in the second set of data strings.

48. The computer program of claim 40, wherein:
each data string in the first set of data strings is comprised of a first number of data characters and each data string in the second set of data strings is comprised of a second number of data characters; and
the at least one of the defined set of shapes applied to the first set of data strings is the same as the at least one of the defined set of shapes applied to the second set of data strings.

49. The computer program of claim 48, wherein the defined set of shapes operate to embed a length filter into the first and second sets of patterns.

50. The computer program of claim 40, further including executable instructions that cause a computer to rotating the at least one of the defined set of shapes through each of data string in the first set data strings when applying the at least one of the defined set of shapes to the first set of data strings.

51. The computer program of claim 40, wherein the at least one of the defined set of shapes comprises a length of one or more characters, the length operable to generate a maximum number of unique patterns associated with the first set of data strings when the at least one of the defined set of shapes is applied to the first set of data strings.

52. The computer program of claim 51, wherein the length is operable to generate a maximum number of unique patterns associated with the second set of data strings when the at least one of the defined set of shapes is applied to the second set of data strings.

* * * * *